US012603035B2

(12) United States Patent
Kim et al.

(10) Patent No.: US 12,603,035 B2
(45) Date of Patent: Apr. 14, 2026

(54) DISPLAY APPARATUS AND DRIVING METHOD THEREOF

(71) Applicant: LG Display Co., Ltd., Seoul (KR)

(72) Inventors: Jong Taek Kim, Paju-si (KR); Ji Yong Hwang, Paju-si (KR); Ki Tae Yu, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/066,445

(22) Filed: Feb. 28, 2025

(65) Prior Publication Data

US 2025/0273122 A1 Aug. 28, 2025

(30) Foreign Application Priority Data

Feb. 28, 2024 (KR) ........................ 10-2024-0028753

(51) Int. Cl.
*G09G 3/20* (2006.01)
*G06F 3/044* (2006.01)
*G09G 3/00* (2006.01)
*G09G 3/3225* (2016.01)

(52) U.S. Cl.
CPC ......... *G09G 3/2092* (2013.01); *G06F 3/0443* (2019.05); *G09G 3/035* (2020.08); *G09G 3/3225* (2013.01); *G09G 2300/0408* (2013.01); *G09G 2300/0465* (2013.01); *G09G 2300/0819* (2013.01); *G09G 2310/0286* (2013.01); *G09G 2320/0233* (2013.01); *G09G 2320/0247* (2013.01); *G09G 2320/0693* (2013.01)

(58) Field of Classification Search
CPC .... G09G 3/2092; G09G 3/035; G09G 3/3225; G09G 2300/0408; G09G 2300/0465; G09G 2300/0819; G09G 2310/0286; G09G 2320/0233; G09G 2320/0247; G09G 2320/0693; G06F 3/0443
See application file for complete search history.

(56) References Cited

U.S. PATENT DOCUMENTS

2013/0151185 A1* 6/2013 Yagoshi .................. G06F 17/00
702/58

FOREIGN PATENT DOCUMENTS

KR 10-0925470 B1 10/2009
KR 10-0940622 B1 1/2010
KR 10-1252048 B1 4/2013
KR 10-2023-0009203 A 1/2023

* cited by examiner

*Primary Examiner* — Michael A Faragalla
(74) *Attorney, Agent, or Firm* — Birch, Stewart, Kolasch & Birch, LLP

(57) ABSTRACT

A display apparatus can include a display panel configured to display an image, a gate driver configured to apply a gate signal to the display panel, a driving circuit, and a jitter correction circuit. The driving circuit includes a signal generating circuit configured to generate a clock signal for driving the gate driver, and a frequency generating circuit configured to generate an internal oscillator signal to allow the clock signal to be generated with an internally set frequency band. The jitter correction circuit can correct a jitter of the clock signal, based on the internal oscillator signal and the clock signal fed back from the signal generating circuit.

8 Claims, 11 Drawing Sheets

DISPLAY APPARATUS AND DRIVING METHOD THEREOF

CROSS-REFERENCE TO RELATED APPLICATIONS

This application claims priority to the Korean Patent Application No. 10-2024-0028753 filed in the Republic of Korea on Feb. 28, 2024, the entire disclosure of which is hereby expressly incorporated by reference into the present application.

BACKGROUND

Technical Field

The present disclosure relates to a display apparatus and a driving method thereof.

Discussion of the Related Art

As information technology advances, a market for display apparatuses which are connection mediums for connecting users to information is growing. Therefore, the use of display apparatuses such as light emitting display apparatuses, quantum dot display (QDD) apparatuses, and liquid crystal display (LCD) apparatuses is increasing.

The display apparatus can include a display panel having a plurality of subpixels, a driver which outputs a driving signal for driving the display panel, and a power supply which generates power to be supplied to the display panel or the driver.

In such a display apparatus, when the driving signal (for example, a scan signal and a data signal) is supplied to each of the subpixels provided in the display panel, a selected subpixel can transmit light or can self-emit light, and thus, an image can be displayed.

The description provided in the background section should not be assumed to be prior art merely because it is mentioned in or associated with the background section. The background section can include information that describes one or more aspects of the subject technology.

SUMMARY OF THE DISCLOSURE

The present disclosure is directed to a display apparatus that substantially obviates one or more problems issues due to limitations and disadvantages of the related art.

An aspect of the present disclosure is to provide a display apparatus and a driving method thereof, which can solve/ address (or minimize or at least partially reduce) a flicker problem where noise or jitter of an oscillator reflected and accumulated in a clock signal can adversely affect luminance and display quality in driving of a display panel, and which can correct an output of the oscillator based on a jitter of the clock signal, thereby enhancing driving stability and reliability.

Additional advantages, aspects, and features of the disclosure will be set forth in part in the description which follows and in part will become apparent to those having ordinary skill in the art upon examination of the following or can be learned from practice of the disclosure. The aspects and other advantages of the disclosure can be realized and attained by the structure particularly pointed out in the written description and the appended claims hereof as well as the appended drawings.

To achieve these aspects and other advantages and in accordance with the purpose of the present disclosure, as embodied and broadly described herein, there is provided a display apparatus which can include a display panel configured to display an image; a gate driver configured to apply a gate signal to the display panel; a driving circuit including a signal generating circuit configured to generate a clock signal needed for driving of the gate driver and a frequency generating circuit configured to generate an internal oscillator signal to allow the clock signal to be generated with an internally set frequency band; and a jitter correction circuit configured to correct a jitter of the clock signal, based on the internal oscillator signal and the clock signal fed back from the signal generating circuit.

According to aspects of the present disclosure, the jitter correction circuit can correct the jitter of the clock signal, based on a comparison result of the internal oscillator signal and an integral jitter value obtained by accumulating and integrating the clock signal fed back from the signal generating circuit.

According to aspects of the present disclosure, the jitter correction circuit can include a jitter detection circuit configured to detect the jitter of the clock signal; a jitter selection circuit configured to generate a jitter selection value based on the jitter of the clock signal; a jitter integral circuit configured to accumulate and integrate the jitter selection value to generate the integral jitter value; and a jitter comparison circuit configured to compare the integral jitter value with the internal oscillator signal.

According to aspects of the present disclosure, the jitter detection circuit can include an XOR (Exclusive OR) gate configured to perform an XOR operation on the clock signal and a division value obtained by dividing the internal oscillator signal to provide an output value; a first AND gate configured to perform an AND operation on the output value of the XOR gate and the division value obtained by dividing the internal oscillator signal to output a first AND operation value; and a second AND gate configured to perform an AND operation on the output value of the XOR gate and an inversion value obtained by inverting the division value obtained by dividing the internal oscillator signal to output a second AND operation value.

According to aspects of the present disclosure, the jitter selection circuit can output a jitter selection value defining whether the jitter of the clock signal is + jitter or – jitter, based on the first AND operation value and the second AND operation value.

According to aspects of the present disclosure, the jitter correction circuit can include a signal division circuit configured to output a division value obtained by dividing the internal oscillator signal; a signal count circuit configured to count the division value of the internal oscillator signal output from the signal division circuit to output a count value; and a jitter comparison circuit configured to compare the internal oscillator signal with the count value output from the signal count circuit and generate a jitter correction value, based on a comparison result.

According to aspects of the present disclosure, the jitter correction circuit can include a jitter margin control circuit configured to generate a jitter margin control value for correcting jitter according to whether there is jitter or not and intensity of jitter, based on the jitter correction value output from the jitter correction circuit.

According to aspects of the present disclosure, the jitter correction circuit can be included in the driving circuit.

A driving method of a display apparatus according to aspects of the present disclosure can include detecting a jitter of a clock signal needed for driving of a gate driver; generating a jitter selection value based on the jitter of the clock signal; accumulating and integrating the jitter selection value to generate an integral jitter value; and comparing the integral jitter value with an internal oscillator signal and generating a jitter correction value for correcting the jitter of the clock signal, based on a comparison result.

A driving method of a display apparatus according to aspects of the present disclosure can include generating an internal oscillator signal so that a clock signal needed for driving of a gate driver is generated with an internally set frequency band; dividing the internal oscillator signal to output a division value; counting the division value of the internal oscillator signal to output a count value; and comparing the count value with the internal oscillator signal and generating a jitter correction value for correcting a jitter of the clock signal, based on a comparison result.

The present disclosure can solve/address (or minimize or at least partially reduce) a flicker problem where noise or jitter of an oscillator reflected and accumulated in a clock signal can adversely affect luminance and display quality in driving of a display panel. The present disclosure can correct an output of the oscillator, based on jitter of the clock signal for driving of a gate driver, thereby enhancing driving stability and reliability.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description are example and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Figure 1:
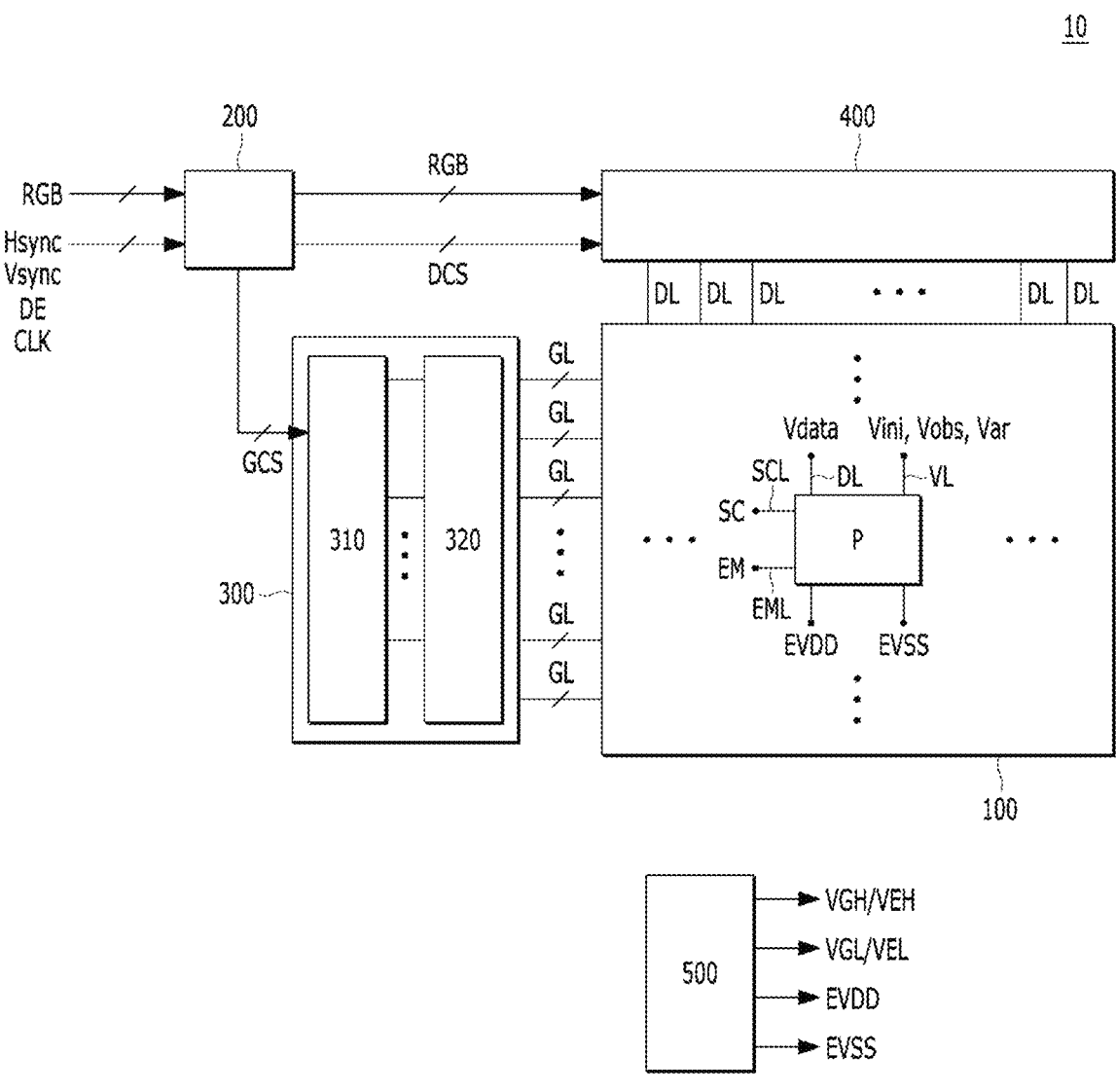
FIG. 1 is a block diagram schematically illustrating a display apparatus according to an example embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE
EMBODIMENTS

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations can be selected only for convenience of writing the specification and can be thus different from those used in actual products.

Hereinafter, details related to the above aspects, technical configurations, and operational effects of the embodiments of the present disclosure will be described more fully with reference to the accompanying drawings, in which example embodiments of the disclosure are shown. The disclosure may, however, be embodied in many different forms and should not be construed as being limited to the example embodiments set forth herein; rather, these example embodiments are provided so that this disclosure will be thorough and complete, and will fully convey the concept of the disclosure to those skilled in the art. Any implementation described herein as an "example" is not necessarily to be construed as preferred or advantageous over other implementations.

The shapes, sizes, ratios, angles, numbers, and the like, which are illustrated in the drawings to describe various example embodiments of the present disclosure are merely given by way of example. Therefore, the present disclosure is not limited to the illustrations in the drawings. The same or similar elements are designated by the same reference numerals throughout the specification unless otherwise specified. In the following description where the detailed description of the relevant known function or configuration can unnecessarily obscure an important point of the present disclosure, a detailed description of such known function of configuration can be omitted.

In construing an element, the element is construed as including an error range or tolerance range although there is no explicit description of such an error or tolerance range.

Where positional relationships are described, for example, where the positional relationship between two parts is described using "on," "over," "under," "above," "below," "beneath," "near," "close to," or "adjacent to," "beside," "next to," or the like, one or more other parts can be disposed between the two parts unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "left," "right," "top," "bottom, "downward," "upward," "upper," "lower," and the like refer to an arbitrary frame of reference.

Here, terms such as, for example, "first", "second", "A," "B," "(a)," and "(b)," can be used to distinguish any one element with another element. However, the first element and the second element can be arbitrary named according to the convenience of those skilled in the art without departing the technical sprit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprise," "have," "include," "contain," "constitute," "make up of," "formed of," specify the presence of stated features, integers, steps, operations, elements, components, and/or combinations thereof, but do not preclude the presence or addition of one or more other features, integers, steps, operations, elements, components, and/or combinations. Further, the term "can" encompasses all the meanings and coverages of the term "may" and vice versa.

In addition, unless 'directly' is used, the terms "connected" and "coupled" can include that two components are "connected" or "coupled" through one or more other components located between the two components.

Features of various embodiments of the present disclosure can be partially or overall coupled to or combined with each other, and can be variously inter-operated with each other and driven technically as those skilled in the art can sufficiently understand. Embodiments of the present disclosure can be carried out independently from each other, or can be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein. For example, the term "part" or "unit" can apply, for example, to a separate circuit or structure, an integrated circuit, a computational block of a circuit device, or any structure configured to perform a described function as should be understood to one of ordinary skill in the art.

A display apparatus according to the present disclosure can be implemented as a light emitting display apparatus or a quantum dot display (QDD) apparatus. Hereinafter, for convenience of description, a light emitting display apparatus self-emitting light based on an inorganic light emitting diode or an organic light emitting diode will be described for example, but the present disclosure is not limited thereto, and other various types of display apparatus can also be similarly applied.

In the present disclosure, a pixel circuit and a gate driver formed on a display panel can include a plurality of transistors. The transistors can be implemented with oxide thin film transistors (oxide TFTs) including an oxide semiconductor, low temperature polysilicon (LTPS) TFTs including low temperature polysilicon, and the like.

Moreover, a thin film transistor (TFT) described below can be implemented with an n-type TFT, a p-type TFT, or a combination of an n-type TFT and a p-type TFT. A TFT can be a three-electrode element including a gate, a source, and a drain. The source can be an electrode which provides a carrier to a transistor. In the TFT, a carrier can start to flow from the source. The drain can be an electrode where the carrier flows from the TFT to the outside. For example, in the TFT, the carrier flows from the source to the drain.

In the p-type TFT, because a carrier is a hole, a source voltage can be higher than a drain voltage so that the hole flows from the source to the drain. In the p-type TFT, because the hole flows from the source to the drain, a current can flow from the source to the drain. On the other hand, in the n-type TFT, because a carrier is an electron, a source voltage can be lower than a drain voltage so that the electron flows from the source to the drain. In the n-type TFT, because the electron flows from the source to the drain, a current can flow from the drain to the source. However, a source and a drain of a TFT can switch therebetween based on a voltage applied thereto. Based thereon, in the following description, one of a source and a drain will be described as a first electrode, and the other of the source and the drain will be described as a second electrode. However, since the source electrode and the drain electrode can be changed according to an applied voltage, the source electrode and the drain electrode of the transistor are not fixed.

Hereinafter, embodiments of the present disclosure will be described in detail with reference to the accompanying drawings. Further, all the components of each display apparatus according to all embodiments of the present disclosure are operatively coupled and configured.

Figure 2:
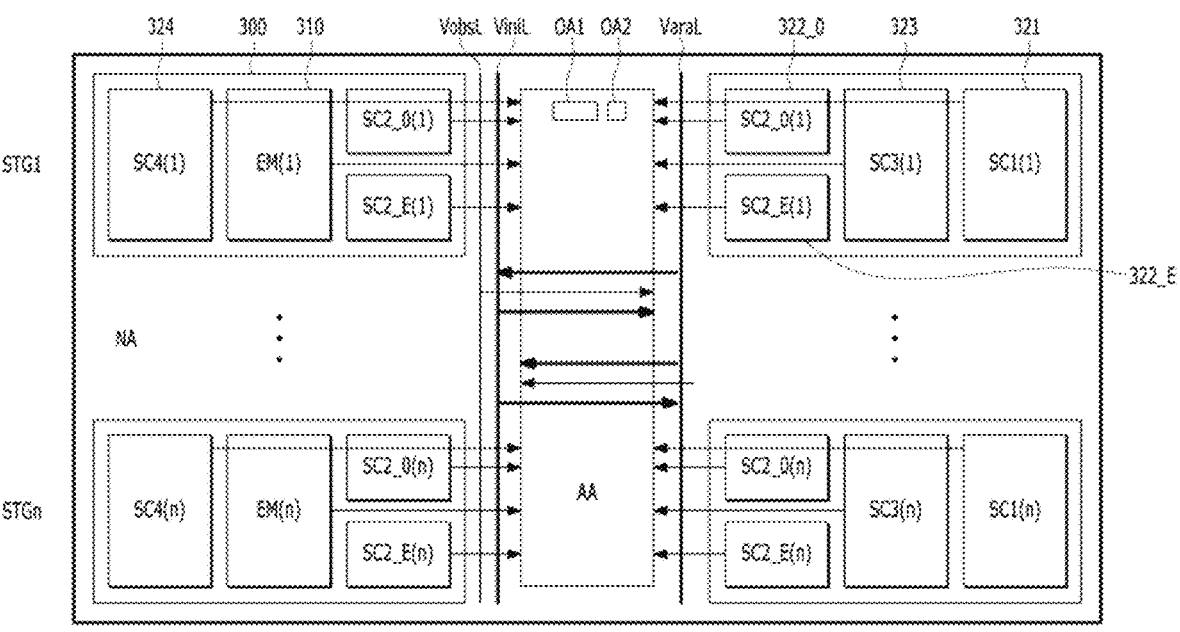
FIG. 2 is a block diagram illustrating an example configuration of a gate driver in the display apparatus of FIG. 1.

FIG. 1 is a block diagram schematically illustrating a display apparatus 10 according to a first embodiment of the present disclosure, and FIG. 2 is a block diagram illustrating a configuration of a gate driver in the display apparatus 10 of FIG. 1.

Hereinafter, various embodiments of the present disclosure will be described in a form of a first embodiment, a second embodiment, etc., but the present disclosure is not limited thereto. For example, all these embodiments are example embodiments for describing the inventive concepts of the present disclosure, and can be partially or entirely coupled or combined with each other to obtain other embodiments of the present disclosure.

Referring to FIGS. 1 and 2, a display apparatus 10 can include a display panel 100 which includes a plurality of subpixels SP, a controller 200, a gate driver (or a gate driving circuit) 300 which supplies a gate signal to the plurality of subpixels SP, a data driver 400 which supplies a data signal (or a data voltage) to the plurality of subpixels SP, and a power supply 500 which supplies power to the plurality of subpixels SP.

The display panel 100 can include a display area or active area (AA of FIG. 2) where the plurality of subpixels SP are provided and a non-display area or non-active area (NA of FIG. 2) which is disposed to be adjacent to (e.g., surround) the display area AA and where the gate driver 300 and the data driver 400 are disposed or connected. The non-display area NA can surround the display area AA entirely or in part(s).

In the display panel 100, a plurality of gate lines GL and a plurality of data lines DL can intersect with one another, and each of the plurality of subpixels SP can be connected to a gate line GL and a data line DL. In detail, one subpixel SP can be supplied with a gate signal from the gate driver 300 through the gate line GL, can be supplied with a data signal from the data driver 400 through the data line DL, and can be supplied with a high-level voltage (e.g., a power voltage) EVDD and a low-level voltage (e.g., a ground voltage) EVSS from the power supply 500.

The gate line GL can transfer a scan signal SC and an emission control signal EM to the plurality of subpixels SP, and the data line DL can transfer a data voltage Vdata to the plurality of subpixels SP. According to various embodiments, the gate line GL can include a plurality of scan lines SCL for supplying the scan signal SC and a plurality of emission control lines EML for supplying the emission control signal EM. The plurality of subpixels SP can be supplied with voltages Vini, Var, and Vobs through a plurality of voltage lines VL, but the present disclosure is not limited thereto. The voltages Vini, Var, and Vobs applied through the plurality of voltage lines VL will be described below.

Each of the plurality of subpixels SP can include a subpixel driving circuit. The subpixel driving circuit can include a plurality of switching elements, a driving element, and a capacitor. The switching element and the driving element can each be configured as a thin film transistor TFT. A switching transistor can be turned on based on the scan signal SC supplied through the scan line SCL and the emission control signal EM supplied through the emission control line EML. A driving transistor can control the amount of current (control the amount or intensity of emitted light) supplied to a light emitting device OLED, based on the data voltage Vdata.

The display panel 100 can be implemented as a non-transmissive display panel or a transmissive display panel. The transmissive display panel can be applied to a transparent display apparatus which displays an image on a screen thereof and enables a real thing or object of a background to be seen. The display panel 100 can be implemented as a flexible display panel. The flexible display panel can use a plastic substrate. Each of the plurality of subpixels SP can be divided into a red subpixel, a green subpixel, and a blue subpixel for color implementation. Each of the plurality of subpixels SP can further include a white subpixel.

Touch sensors can be disposed in the display panel 100. A touch input can be sensed by using separate touch sensors, or can be sensed through the plurality of subpixels SP. The touch sensors can be arranged as an on-cell type or an add-on type in a screen of the display panel 100, or can be implemented as in-cell type touch sensors embedded in the display panel 100.

The controller 200 can process image data RGB input from the outside to supply to the data driver 400, based on a size and a resolution of the display panel 100. The controller 200 can generate a gate control signal GDC and a data control signal DDC by using synchronization signals (for example, a dot clock signal CLK, a data enable signal DE, a horizontal synchronization signal Hsync, and a vertical synchronization signal Vsync) input from the outside. The controller 200 can supply the gate control signal GCS to the gate driver 300 to control an operation timing of the gate driver 300. The controller 200 can supply the data control signal DCS to the data driver 400 to control an operation timing of the data driver 400. The controller 200 can synchronize the operation timing of the gate driver 300 with the operation timing of the data driver 400 by using the gate control signal GCS and the data control signal DCS.

The controller 200 can be configured to be coupled to various processors (for example, a microprocessor, a mobile processor, and an application processor), based on a device mounted thereon. A host system disposed a previous end with respect to the controller 200 can be one of a television (TV) system, a set-top box, a navigation system, a personal computer (PC), a home theater system, a mobile device, a wearable device, and an automotive system.

The controller 200 can multiply an input frame frequency by i (where i can be a positive integer of more than 0) times to control an operation timing of the display panel driver, based on a frame frequency of an input frame frequency X i Hz. The input frame frequency can be about 60 Hz in national television standards committee (NTSC) scheme and can be about 50 Hz in phase-alternating line (PAL) scheme.

The controller 200 can driver the display panel 100 at various refresh rates. The controller 200 can drive the display panel 100 as a switchable type in a variable refresh rate (VRR) mode, for example, between a first refresh rate and a second refresh rate. For example, the controller 200 can simply change a speed of a clock signal, or can generate a synchronization signal so that a horizontal blank or a vertical blank occurs, or can drive the gate driver 300 in a mask mode, thereby driving the display panel 100 at various refresh rates.

A voltage level of the gate control signal GCS output from the controller 200 can be shifted to a gate on voltage VGL (VEL) and a gate off voltage VGH (VEH) by a level shifter and can be supplied to the gate driver 300. The level shifter can shift a low level voltage of the gate control signal GCS to a gate low voltage VGL and can shift a high level voltage of the gate control signal GCS to a gate high voltage VGH. The gate control signal GCS can include a start signal and a clock signal.

The gate driver 300 can supply the gate signal to the gate line GL, based on the gate control signal GCS supplied from the controller 200. The gate driver 300 can be disposed at one side or both sides of the display panel 100 in a gate in panel (GIP) type.

The gate driver 300 can sequentially output the gate signal to the plurality of gate lines GL, based on control by the controller 200. The gate driver 300 can shift the gate signal by using a shift register, and thus, can sequentially supply the signals to the gate lines GL.

In an organic light emitting display apparatus, the gate signal can include the scan signal SC and the emission control signal EM. The scan signal SC can include a scan pulse which swings between a gate on voltage VGL and a gate off voltage VGH. The emission control signal EM can include an emission control signal pulse which swings between a gate on voltage VEL and a gate off voltage VEH.

The scan pulse can select subpixels SP of a line in which a data voltage Vdata is to be written. The emission control signal EM can define an emission time of each of the subpixels SP.

The gate driver 300 can include an emission control signal driver 310 and one or more scan drivers 320. The emission control signal driver 310 can output the emission control signal pulse in response to a start signal and a clock signal from the controller 200 and can sequentially shift the emission control signal pulse according to the clock signal. The one or more scan drivers 320 can output the scan pulse in response to the start signal (or a start pulse) and the clock signal (or a shift clock) from the controller 200 and can shift the scan pulse, based on a clock signal timing.

The data driver 400 can convert the image data RGB into a data voltage Vdata, based on the data control signal DCS supplied from the controller 200, and can output the data voltage Vdata through the data line DL.

In FIG. 1, the data driver 400 is disposed as one type at one side of the display panel 100, but the number and arrangement positions of data drivers 400 are not limited thereto. For example, the data driver 400 can be configured with a plurality of integrated circuits (ICs) and can be provided in plurality, and the plurality of data drivers 400 can be divided and arranged at one side of the display panel 100.

The power supply 500 can generate a direct current (DC) power for driving of the display panel driver and a subpixel array of the display panel 100 by using a DC-DC converter. The DC-DC converter can include a charge pump, a regulator, a buck converter, and a boost converter. The power supply 500 can receive a DC input voltage applied from the host system to generate the gate on voltage VGL (VEL). The power supply 500 can generate DC voltages such as the gate off voltage VGH (VEH), the high-level voltage EVDD, and the low-level voltage EVSS. The gate on voltage VGL (VEL) and the gate off voltage VGH (VEH) can be supplied to the level shifter and the gate driver 300. In another example, the level shifter can be included as a part of the gate driver 300. The high-level voltage EVDD and the low-level voltage EVSS can be supplied to the plurality of subpixels SP in common.

Referring back to FIGS. 1 and 2, the gate driver 300 can include the emission control signal driver 310 and the scan driver 320. The scan driver 320 can include first to fourth scan drivers 321 to 324. Further, the second scan driver 322 can include odd-numbered second scan drivers 322_O and even-numbered second scan drivers 322_E.

Shift registers configuring the gate driver 300 can be configured to be symmetric at both sides of the display area AA. The shift register of one side of the display area AA can include second scan drivers 322_O and 322_E, the fourth scan driver 324, and the emission control signal driver 310, and the shift register of the other side of the display area AA can include the first scan driver 321, second scan drivers 322_O and 322_E, and the third scan driver 323. In FIG. 2, an example is illustrated where the odd-numbered second scan driver 322_O and the even-numbered second scan driver 322_E have a structure where an odd-numbered subpixel and an even-numbered subpixel share the second scan driver 322. Accordingly, the emission control signal driver 310 and the first to fourth scan drivers 321 to 324 can be differently arranged, but are not limited thereto.

Stages STG1 to STGn of the shift register can respectively include first scan signal generators SC1(1) to SC1(*n*), second scan signal generators SC2_O(1) to SC2_O(n) and SC2_E(1) to SC2_E(n), third scan signal generators SC3(1)

to SC3(*n*), fourth scan signal generators SC4(1) to SC4(*n*), and emission control signal generators EM(1) to EM(n). Here, n can be a real number such as a positive integer. In FIG. 2, an $N^{th}$ stage STGn of the shift register is illustrated as a last stage. However, at least one dummy stage can also be disposed at a previous stage with respect to the first stage STG1 of the shift register and a next stage with respect to the $N^{th}$ stage STGn of the shift register.

The first scan signal generators SC1(1) to SC1(*n*) can respectively output first scan signals SC1(1) to SC1(*n*) through first scan lines SCL1 of the display panel 100. The second scan signal generators SC2(1) to SC2(*n*) can respectively output second scan signals SC2(1) to SC2(*n*) through second scan lines SCL2 of the display panel 100. The third scan signal generators SC3(1) to SC3(*n*) can respectively output third scan signals SC3(1) to SC3(*n*) through third scan lines SCL3 of the display panel 100. The fourth scan signal generators SC4(1) to SC4(*n*) can respectively output fourth scan signals SC4(1) to SC4(*n*) through fourth scan lines SCL4 of the display panel 100. The emission control signal generators EM(1) to EM(n) can respectively output emission control signals EM(1) to EM(n) through emission control lines EML of the display panel 100.

The first scan signals SC1(1) to SC1(*n*) can be used as a signal for driving an $A^{th}$ transistor (for example, a compensation transistor) included in the subpixel driving circuit. The second scan signals SC2(1) to SC2(*n*) can be used as a signal for driving a $B^{th}$ transistor (for example, a data supply transistor) included in the subpixel driving circuit. The third scan signals SC3(1) to SC3(*n*) can be used as a signal for driving a $C^{th}$ transistor (for example, a bias transistor) included in the subpixel driving circuit. The fourth scan signals SC4(1) to SC4(*n*) can be used as a signal for driving a $D^{th}$ transistor (for example, an initialization transistor) included in the subpixel driving circuit. The emission control signals EM(1) to EM(n) can be used as a signal for driving an $E^{th}$ transistor (for example, an emission control transistor) included in the subpixel driving circuit. For example, when the emission control transistor is controlled by using the emission control signals EM(1) to EM(n), an emission time of a light emitting device can vary.

A bias voltage line VobsL transferring a bias voltage, a first initialization voltage line VaraL transferring a first initialization voltage, and a second initialization voltage line ViniL transferring a second initialization voltage can be disposed between the gate driver 300 and the display area AA.

Each of the bias voltage line VobsL, the first initialization voltage line VaraL, and the second initialization voltage line ViniL is illustrated as being disposed at one side of a left side or a right side of the display area AA, but is not limited thereto and can be disposed at both sides, or even when being disposed at one side, a position is not limited to the left side or the right side. It is to be noted that, although a detailed configuration of the gate driver in the display apparatus is shown in FIG. 2, the present disclosure is not limited thereto, and any other configurations of the gate driver are also possible, and the number of the scan lines provided for the display apparatus is not limited to the four scan lines shown in FIG. 2 and can be more or less when necessary.

Furthermore, one or more optical regions OA1 and OA2 can be disposed in the display area AA. The optical regions OA1 and OA2 can be disposed to overlap one or more optical electronic devices such as an imaging device such as a camera (an image sensor) and a sensing sensor such as a proximity sensor and an illumination sensor.

The optical regions OA1 and OA2 can have a light transmissive structure, for an operation of an optical electronic device, and thus, can have a transmittance of a certain level or more. In other words, the number of pixels P per unit area in the optical regions OA1 and OA2 can be less than the number of pixels per unit area in a normal region, except the optical regions OA1 and OA2, of the display area AA. For example, a resolution of each of the optical regions OA1 and OA2 can be lower than that of the normal region of the display area AA.

In the optical regions OA1 and OA2, the light transmissive structure can be configured by patterning a cathode electrode in a portion where a subpixel is not disposed. In this case, the patterned cathode electrode can be removed by using a laser, or by using a material such as a cathode deposition prevention layer, the cathode electrode can be selectively patterned.

Moreover, in the optical regions OA1 and OA2, the light transmissive structure can be configured by separately forming a light emitting device and a subpixel driving circuit included in a subpixel. In other words, the light emitting device of the subpixel can be disposed in the optical regions OA1 and OA2, and a plurality of transistors configuring the subpixel driving circuit can be disposed near the optical regions OA1 and OA2, and thus, the light emitting device can be electrically connected to the subpixel driving circuit through a transparent metal layer. Accordingly, the number of pixels P per unit area in the optical regions OA1 and OA2 can increase so as to improve the image quality displayed in the optical regions OA1 and OA2.

Figure 3:
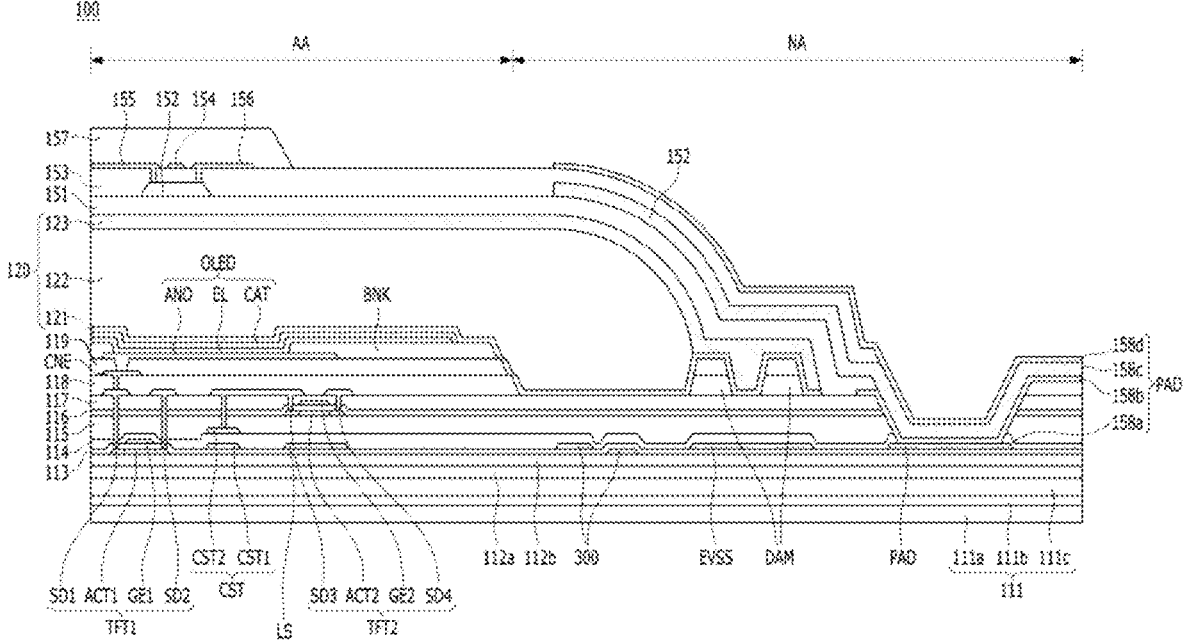
FIG. 3 is a cross-sectional view illustrating a stack type of a display panel according to an example embodiment of the present disclosure.

FIG. 3 is a cross-sectional view illustrating a stack type of a display panel 100 according to a first embodiment of the present disclosure.

Referring to FIG. 3, transistors TFT1 and TFT2 and a capacitor CST for driving a light emitting device OLED disposed in a display area AA can be disposed on a substrate 111 of the display panel 100. The transistors TFT1 and TFT2 can be a switching thin film transistor and a driving transistor respectively, and can include a polycrystalline thin film transistor including a polycrystalline semiconductor material and an oxide thin film transistor including an oxide semiconductor material. In this case, a thin film transistor including a polycrystalline semiconductor material can be referred to as a polycrystalline thin film transistor TFT1, and a thin film transistor including an oxide semiconductor material can be referred to as an oxide thin film transistor TFT2, but the present disclosure is not limited thereto. For example, the polycrystalline thin film transistor TFT1 can be a transistor connected to the light emitting device OLED, and the oxide thin film transistor TFT2 can be a transistor connected to the capacitor CST.

The substrate 111 can be implemented as a multi-layer (e.g., 111a to 111c) where an organic layer and an inorganic layer are alternately stacked. For example, in the substrate 111, an organic layer such as polyimide and an inorganic layer such as oxide silicon ($SiO_x$) can be alternately stacked. In addition, the substrate 111 can include a plastic substrate, a glass substrate, or a flexible polymer film. For example, the flexible polymer film can be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example and is not necessarily limited thereto.

A lower buffer layer 112a can be formed on the substrate 111. The lower buffer layer 112a can be for preventing the penetration of water from the outside and can use an $SiO_x$ layer which is stacked as a multilayer. An auxiliary buffer layer 112b can be further disposed on the lower buffer layer 112a, so as to protect elements from the penetration of water.

The polycrystalline thin film transistor TFT1 can be formed on the substrate 111. The polycrystalline thin film transistor TFT1 can use a polycrystalline (for example, low temperature polysilicon) as an active layer. The polycrystalline thin film transistor TFT1 can include a first active layer ACT1 including a channel through which an electron or a hole moves, a first gate electrode GE1, a first source electrode SD1, and a first drain electrode SD2. A first gate insulation layer 113 can be disposed between the first gate electrode GE1 and the first active layer ACT1 and can use an inorganic layer such as nitride silicon (SiNx) or a $SiO_x$ layer, which is stacked as a single layer or a multiplayer.

The first active layer ACT1 can include a first channel region, a first source region disposed at one side with respect to the first channel region, and a first drain region disposed at the other side with respect to the first channel region. The first source region and the first drain region can each be a region which is conductive by doping a Group 5 or 3 impurity ion (for example, phosphorus (P) or boron (B)) on an intrinsic polycrystalline semiconductor material at a certain concentration. The first channel region can allow a polycrystalline semiconductor material to maintain an intrinsic state and can provide a path through which an electron or a hole moves.

According to an embodiment, the polycrystalline thin film transistor TFT1 can be implemented in a top gate structure where the first gate electrode GE1 is disposed on the first active layer ACT1. Accordingly, a first electrode CST1 included in the capacitor CST and a light blocking layer LS included in the oxide thin film transistor TFT2 can be formed of the same material as that of the first gate electrode GE1. The first gate electrode GE1, the first electrode CST1, and the light blocking layer LS can be formed through one mask process, thereby reducing a mask process.

The first gate electrode GE1 can include a metal material. For example, the first gate electrode GE1 can be a single layer or a multilayer including one of molybdenum (Mo), aluminum (Al), chrome (Cr), gold (Au), titanium (Ti), nickel (Ni), neodymium (Nd), and copper (Cu), or an alloy thereof, but is not limited thereto. A first interlayer insulation layer 114 can be disposed on the first gate electrode GE1. The first interlayer insulation layer 114 can be implemented with $SiO_x$ or SiNx.

The display panel 100 can further include an upper buffer layer 115, a second gate insulation layer 116, and a second interlayer insulation layer 117, which are sequentially disposed on the first interlayer insulation layer 114, and the polycrystalline thin film transistor TFT1 can include a first source electrode SD1 and a first drain electrode SD2, which are formed on the second interlayer insulation layer 117 and are respectively connected to the first source region and the first drain region.

The first source electrode SD1 and the first drain electrode SD2 can be a single layer or a multilayer including one of Mo, Al, Cr, Au, Ti, Ni, Nd, and Cu, or an alloy thereof, but are not limited thereto.

The upper buffer layer 115 can separate the second active layer ACT2 of the oxide thin film transistor TFT2, implemented with an oxide semiconductor material, from the first active layer ACT1 implemented with a polycrystalline semiconductor material and can provide a basis for forming the second active layer ACT2.

The second gate insulation layer 116 can cover the second active layer ACT2 of the oxide thin film transistor TFT2. The second gate insulation layer 116 can be formed on the second active layer ACT2 implemented with an oxide semiconductor material, and thus, can be implemented as an inorganic layer. For example, the second gate insulation layer 116 can be $SiO_x$ or SiNx.

The second gate electrode GE2 can be configured with a metal material. For example, the second gate electrode GE2 can be a single layer or a multilayer including one of Mo, Al, Cr, Au, Ti, Ni, Nd, and Cu, or an alloy thereof, but are not limited thereto.

The oxide thin film transistor TFT2 can be formed on the upper buffer layer 115. The oxide thin film transistor TFT2 can include a second active layer ACT2 implemented with an oxide semiconductor material, a second gate electrode GE2 disposed on the second gate insulation layer 116, and a second source electrode SD3 and a second drain electrode SD4 which are disposed on the second interlayer insulation layer 117. The second active layer ACT2 can be implemented with an oxide semiconductor material and can include an intrinsic second channel region which is not doped with impurities and a second source region and a second drain region which are conductive by doping impurities.

The oxide thin film transistor TFT2 can further include a light blocking layer LS which is disposed under the upper buffer layer 115 to overlap the second active layer ACT2. The light blocking layer LS can prevent light from being incident on an active layer 401 and can thus secure the reliability of the oxide thin film transistor TFT2. The light blocking layer LS can be formed of the same material as that of the first gate electrode GE1 and can be disposed on an upper surface of the first gate insulation layer 113. The light blocking layer LS can be electrically connected to the second gate electrode GE2 to configure a dual gate. In this case, voltage of the light blocking layer LS is not floated, and thus can avoid the influence of the floated voltage to the second gate electrode GE2.

The second source electrode SD3 and the second drain electrode SD4 can be simultaneously formed of the same material on the second interlayer insulation layer 117 along with the first source electrode SD1 and the first drain electrode SD2, and thus, can reduce the number of mask processes.

Furthermore, the second electrode CST2 can be disposed on the first interlayer insulation layer 114 to overlap the first electrode CST1 and can thus implement the capacitor CST. For example, the second electrode CST2 can be a single layer or a multilayer including one of Mo, Al, Cr, Au, Ti, Ni, Nd, and Cu, or an alloy thereof.

The capacitor CST can store a data voltage, applied through a data line DL, during a certain period. The capacitor CST can include two electrodes corresponding to each other and a dielectric disposed therebetween. The first interlayer insulation layer 114 can be disposed between the first electrode CST1 and the second electrode CST2.

The first electrode CST1 and the second electrode CST2 of the capacitor CST can be electrically connected to the second source electrode SD3 or the second drain electrode SD4 of the oxide thin film transistor TFT2. However, an embodiment is not limited thereto, and a connection relationship of the capacitor CST can be changed based on a subpixel driving circuit.

A first planarization layer 118 and a second planarization layer 119 for planarizing a surface can be sequentially disposed on the subpixel driving circuit. The first planarization layer 118 and the second planarization layer 119 can each be an organic layer such as polyimide or acrylic resin. The light emitting device OLED can be formed on the second planarization layer 119.

The light emitting device OLED can include an anode electrode ANO, a cathode electrode CAT, and an emission layer EL disposed between the anode electrode ANO and the cathode electrode CAT. In a case where the subpixel driving circuit using in common a low-level voltage connected to the cathode electrode CAT is implemented, the anode electrode ANO can be disposed as a separate electrode for each subpixel. On the other hand, in a case where the subpixel driving circuit using in common a high-level voltage is implemented, the cathode electrode CAT can be disposed as a separate electrode for each subpixel.

The light emitting device OLED can be electrically connected to a driving element through a center electrode CNE disposed on the first planarization layer 118. For example, the anode electrode ANO of the light emitting device OLED and the first source electrode SD1 of the polycrystalline thin film transistor TFT1 configuring the subpixel driving circuit can be connected to each other by the center electrode CNE.

The anode electrode ANO can be connected to the center electrode CNE exposed through a contact hole passing through the second planarization layer 119. The center electrode CNE can be connected to the first source electrode SD1 exposed through a contact hole passing through the first planarization layer 118.

The center electrode CNE can function a medium which connects the first source electrode SD1 to the anode electrode ANO. The center electrode CNE can include a conductive material such as Cu, Ag, Mo, or Ti.

The anode electrode ANO can be formed in a multi-layer structure including a transparent conductive layer and an opaque conductive layer which is high in reflection efficiency. The transparent conductive layer can include a material, which is relatively large in work function value, such as indium tin oxide (ITO) or indium zinc oxide (IZO), and the opaque conductive layer can be formed in a single-layer or multi-layer structure which includes Al, Ag, Cu, lead (Pb), Mo, or Ti, or an alloy thereof. For example, the anode electrode ANO can be formed in a structure where a transparent conductive layer, an opaque conductive layer, and a transparent conductive layer are sequentially stacked, or can be formed in a structure where a transparent conductive layer and an opaque conductive layer are sequentially stacked. The emission layer EL can be formed by stacking a hole-related layer, an organic emission layer, and an electron-related layer on the anode electrode ANO in order or reverse order. For example, the emission layer EL can include one or more of a hole injection layer (HIL), a hole transmitting layer (HTL), an organic emission layer, an electron transmitting layer (ETL) and an electron injection layer (EIL) which are sequentially stacked, but the present disclosure is not limited thereto.

A bank layer BNK can be a subpixel definition layer which exposes the anode electrode ANO of each subpixel. The bank layer BNK can be formed of an opaque material (for example, black) so as to prevent light interference between adjacent subpixels. In this case, the bank layer BNK can include a light blocking material including at least one of a color pigment, organic black, and carbon.

The cathode electrode CAT can be formed on an upper surface and a lateral surface of the emission layer EL so as to be opposite to the anode electrode ANO with the emission layer EL therebetween. The cathode electrode CAT can be formed as one body to cover most or all of the display area AA. In a case where the cathode electrode CAT is applied to an organic light emitting display apparatus of a top emission type, the cathode electrode CAT can include a transparent conductive layer such as ITO or IZO.

An encapsulation layer 120 for preventing the penetration of water or oxygen can be further disposed on the cathode electrode CAT. The encapsulation layer 120 can prevent the penetration of external water or oxygen into the emission layer EL vulnerable to external water or oxygen. To this end, the encapsulation layer 120 can include an at least one-layer inorganic encapsulation layer and an at least one-layer organic encapsulation layer, but is not limited thereto. The encapsulation layer 120 can include a first encapsulation layer 121, a second encapsulation layer 122, and a third encapsulation layer 123, which are sequentially stacked.

The first encapsulation layer 121 and the third encapsulation layer 123 can include an inorganic insulating material, which is capable of low temperature deposition, such as SiNx, SiOx, oxynitride silicon (SiON), or oxide aluminum (Al$_2$O$_3$). The first encapsulation layer 121 and the third encapsulation layer 123 can be deposited in a low temperature atmosphere, and thus, can prevent the damage of the emission layer EL vulnerable to a high temperature atmosphere when performing a deposition process of the first encapsulation layer 121 and the third encapsulation layer 123.

The second encapsulation layer 122 can perform a buffer function of decreasing a stress between layers caused by the bending of the display apparatus 10 and can planarize a step height between layers. The second encapsulation layer 122 can be formed on the substrate 111 where the first encapsulation layer 121 is formed and can include acryl resin, epoxy resin, phenolic resin, polyamide resin, polyimide resin, and polyethylene, or a non-photosensitive organic insulating material such as silicon oxycarbide (SiOC), or a photosensitive organic insulating material such as photo acryl, but an embodiment is not limited thereto.

In a case where the second encapsulation layer 122 is formed through an inkjet process, a dam DAM can be disposed to prevent the second encapsulation layer 122 from being diffused to an edge of the substrate 111. The dam DAM can be disposed closer to the edge of the substrate 111 than the second encapsulation layer 122. The dam DAM can prevent the second encapsulation layer 122 from being diffused to a pad region where a conductive pad disposed at an outermost portion of the substrate 111 is provided.

The dam DAM can be designed to prevent the diffusion of the second encapsulation layer 122, but in a case where the second encapsulation layer 122 is formed to flow over a height of the dam DAM when performing a process, the second encapsulation layer 122 which is an organic layer can be exposed at the outside, and due to this, water can penetrate into the light emitting device OLED. Accordingly, in order to solve such a problem, the dam DAM can be provided as two or more in succession, to have better moisture blocking effect.

The dam DAM can be disposed on the second interlayer insulation layer 117 of a non-display area NA. Further, the dam DAM can be formed simultaneously with the first planarization layer 118 and the second planarization layer 119. A lower layer of the dam DAM can be formed together when forming the first planarization layer 118, and an upper layer of the dam DAM can be formed together when forming the second planarization layer 119, and thus, the dam DAM can be stacked and formed in a double structure. Accordingly, the dam DAM can include the same insulating material as that of the first planarization layer 118 and the second planarization layer 119, but an embodiment is not limited thereto.

The dam DAM can be formed to overlap a low-level voltage line EVSS. For example, the low-level voltage line EVSS can be disposed in a lower layer of a region, where the dam DAM is disposed, of the non-display area NA. The low-level voltage line EVSS can be disposed more outward than the gate driver 300 and can surround the display area AA. For example, the low-level voltage line EVSS can include the same material as that of the first gate electrode GE1, but is not limited thereto and can include the same material as that of the second electrode CST2 or the first source electrode SD1 and the first drain electrode SD2. The low-level voltage line EVSS can be electrically connected to the cathode electrode CAT so as to apply the low-level voltage EVSS to a plurality of subpixels included in the display area AA.

A touch layer can be disposed on the encapsulation layer 120. In the touch layer, a touch buffer layer 151 can be disposed between the cathode electrode CAT of the light emitting device OLED and a touch sensor metal layer including touch electrodes 155 and 156 and touch electrode connection lines 152 and 154.

The touch buffer layer 151 can prevent external water or a chemical solution (for example, a developer or an etchant), which is used in a manufacturing process of the touch sensor metal layer disposed on the touch buffer layer 151, from penetrating into the emission layer EL including an organic material. Accordingly, the touch buffer layer 151 can prevent the damage of the emission layer EL vulnerable to the chemical solution or water.

The touch buffer layer 151 can include an organic insulating material which has a low dielectric constant of 1 to 3 and is capable of being formed at a low temperature of a certain temperature (for example, 100° C.) or less, so as to prevent the damage of the emission layer EL including an organic material vulnerable to a high temperature. For example, the touch buffer layer 151 can include an acrylic material, an epoxy-based material, or a siloxane-based material. The touch buffer layer 151 which includes an organic insulating material and has planarization performance can prevent the damage of the encapsulation layer 120 caused by the bending of an apparatus and the breakage of the touch sensor metal layer formed on the touch buffer layer 151.

According to a touch sensor structure based on a mutual capacitance, the touch electrodes 155 and 156 can be disposed on the touch buffer layer 151, and the touch electrodes 155 and 156 can be disposed to intersect with each other. The touch electrode connection lines 152 and 154 can electrically connect the touch electrodes 155 and 156 with each other. The touch electrode connection lines 152 and 154 and the touch electrodes 155 and 156 can be disposed in different layers with the touch insulation layer 153 therebetween. The touch electrode connection lines 152 and 154 can be disposed to overlap the bank layer BNK and can prevent a reduction in aperture ratio.

In the touch electrodes 155 and 156, a portion of the touch electrode connection line 152 can pass through an upper portion and a lateral surface of the encapsulation layer 120 and an upper portion and a lateral surface of the dam DAM and can be electrically connected to a touch driving circuit through a touch pad PAD. A portion of the touch electrode connection line 152 can be supplied with a touch driving signal from a touch driving circuit and can transfer the touch driving signal to the touch electrodes 155 and 156, or can transfer touch sensing signals of the touch electrodes 155 and 156 to the touch driving circuit.

The touch pad PAD can include a first pad layer 158*a* including the same layer and material as those of the first gate electrode GE1, a second pad layer 158*b* including the same layer and material as those of the first source electrode SE1 and the first drain electrode DE1, a third pad layer 158*c* including the same layer and material as those of the touch electrode connection line 152, and a fourth pad layer 158*d* including the same layer and material as those of the touch electrodes 155 and 156.

A touch protection layer 157 can be disposed on the touch electrodes 155 and 156. In the drawings, the touch protection layer 157 is illustrated as being disposed on only the touch electrodes 155 and 156, but an embodiment is not limited thereto and the touch protection layer 157 can extend up to a previous portion or a next portion with respect to the dam DAM and can be disposed on the touch electrode connection line 152. Moreover, a color filter can be further disposed on the encapsulation layer 120, and the color filter can be disposed on the touch layer or can be disposed between the encapsulation layer 120 and the touch layer.

Figure 4:
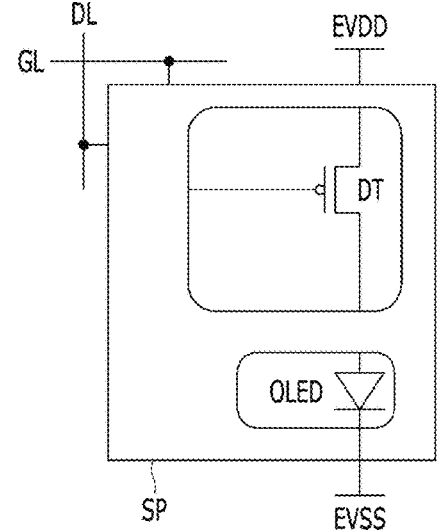
FIG. 4 is a first diagram illustrating a portion of a device included in a subpixel according to an example embodiment of the present disclosure.
Figure 5:
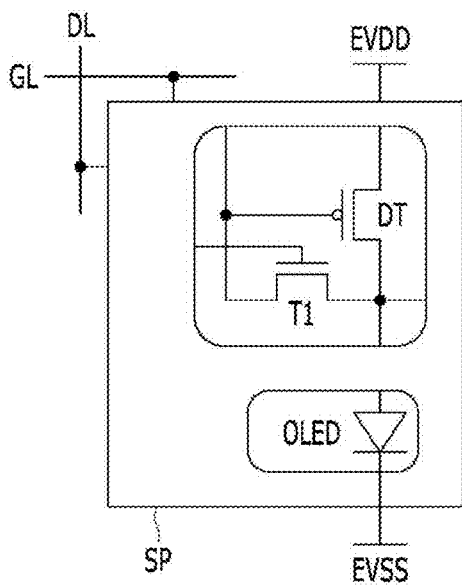
FIG. 5 is a second diagram illustrating a portion of a device included in a subpixel according to an example embodiment of the present disclosure.

FIG. 4 is a first diagram illustrating a portion of a device included in a subpixel according to a first embodiment of the present disclosure, and FIG. 5 is a second diagram illustrating a portion of a device included in a subpixel according to a first embodiment of the present disclosure.

Referring to FIG. 4, a subpixel SP can include a driving transistor DT and a light emitting device OLED. The driving transistor DT can be implemented as a p type. The p-type driving transistor DT can operate in response to a low voltage. The light emitting device OLED can emit light with a driving current generated based on an operation of the driving transistor DT.

Referring to FIG. 5, a subpixel SP can include a first transistor T1, a driving transistor DT, and a light emitting device OLED. The first transistor T1 can be implemented as an n type, and the driving transistor DT can be implemented as a p type. The n-type first transistor T1 can operate in response to a high voltage, and the p-type driving transistor DT can operate in response to a low voltage. The light emitting device OLED can emit light with a driving current generated based on operations of the first transistor T1 and the driving transistor DT.

Referring to FIGS. 4 and 5, the subpixel SP can be implemented based on a transistor of one type, or can be implemented based on transistors of two types. Further, the subpixel SP can further include a circuit for compensating for the driving transistor DT and the light emitting device OLED. Therefore, the subpixel SP according to an embodiment can be variously implemented and only described with reference to FIGS. 4 and 5 by way of example, but the present disclosure is not limited thereto. In the present disclosure, for convenience of explanation, a structure in which the subpixel SP is provided with two transistors as illustrated in FIG. 5 is taken as an example, but embodiments of the present disclosure are not limited thereto. For example, 2T1C, 3T1C, 4T1C, 5T1C, 3T2C, 4T2C, 5T2C, 6T1C, 6T2C, 7T1C, 7T2C, 8T1C, 8T2C structures, etc. are also possible. And more or less transistors and/or capacitors could be included. Hereinafter, a stack type of a display panel will be described with reference to an example where the subpixel SP is implemented based on the circuit illustrated in FIG. 5.

Figure 6:
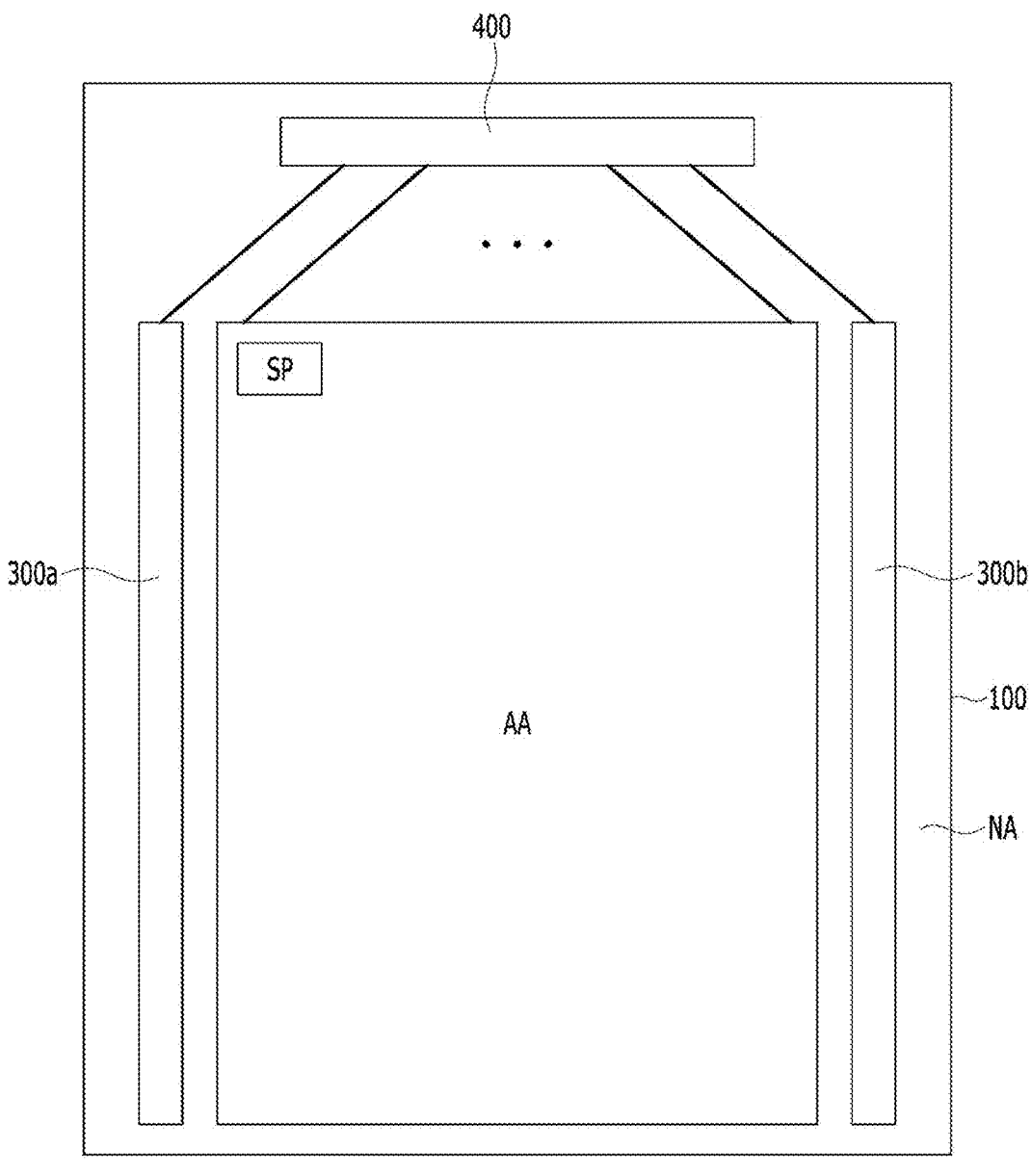
FIG. 6 is an example diagram illustrating a shift register included in a gate driver according to an example embodiment of the present disclosure.
Figure 7:
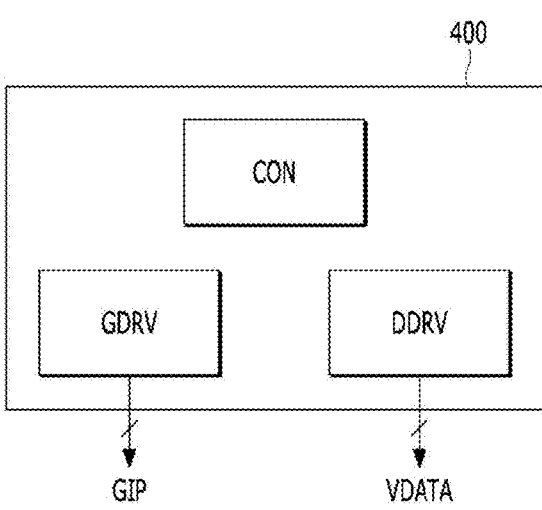
FIG. 7 is an example diagram illustrating a panel driving circuit according to an example embodiment of the present disclosure.

FIG. 6 is an example diagram illustrating a shift register included in a gate driver according to a first embodiment of the present disclosure, and FIG. 7 is an example diagram illustrating a panel driving circuit according to the first embodiment of the present disclosure.

Referring to FIG. 6, the gate driver can include shift registers (for example, first and second shift registers) 300*a* and 300*b* which output a gate signal. The shift registers 300*a* and 300*b* can be formed in a non-display area NA of a display panel 100, based on the GIP type (or a thin film process). For example, the first shift register 300*a* can be formed in one (left) non-display area NA of the display panel 100, and the second shift register 300*b* can be formed in the other (right) non-display area NA of the display panel 100.

Furthermore, the arrangement of the shift registers 300*a* and 300*b* can be merely an embodiment, and an embodiment is not limited thereto. For example, the shift registers 300*a* and 300*b* can be formed in a display area AA of the display panel 100. In this case, elements configuring the shift registers 300*a* and 300*b* can be distributed and disposed in a subpixel SP disposed in the display area AA.

Referring to FIG. 7, the controller 200 and the data driver 400 described above with reference to FIG. 1 can be integrated into one integrated circuit (IC) and can be implemented as a panel driving circuit 400. The panel driving circuit 400 can be mounted in an upper non-display area NA of the display panel 100. The panel driving circuit 400 can include a control circuit CON, a first driving circuit DDRV, and a second driving circuit GDRV.

The control circuit CON can perform a function of controlling the first driving circuit DDRV and the second driving circuit GDRV, based on a control signal applied from the outside. The first driving circuit DDRV can perform a function of generating a data voltage VDATA by using a data signal applied from the outside, based on control by the control circuit CON. The second driving circuit GDRV can perform a function of generating a GIP signal GIP for driving the shift registers 300*a* and 300*b* of FIG. 7, based on control by the control circuit CON. The GIP signal GIP can include a start signal for controlling an operation start of each of the shift registers 300*a* and 300*b* and a clock signal for controlling an output of each of the shift registers 300*a* and 300*b*.

Figure 8:
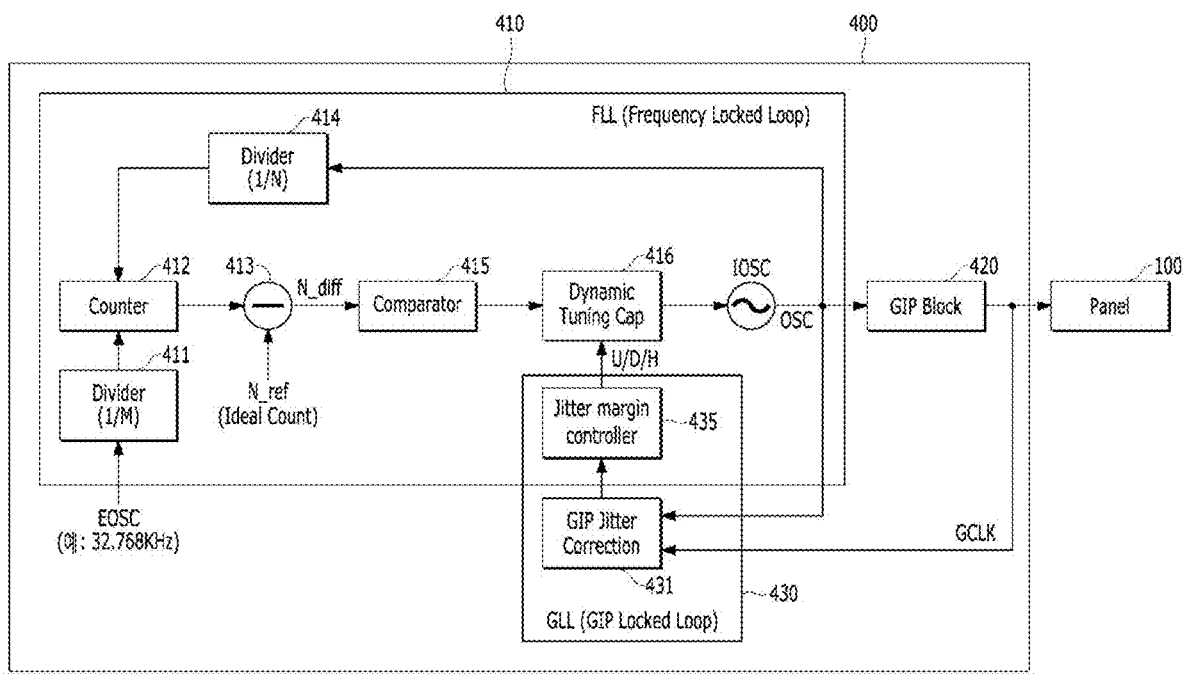
FIG. 8 is a block diagram illustrating a frequency generating circuit and a frequency compensation circuit included in a panel driving circuit according to an example embodiment of the present disclosure.
Figure 9:
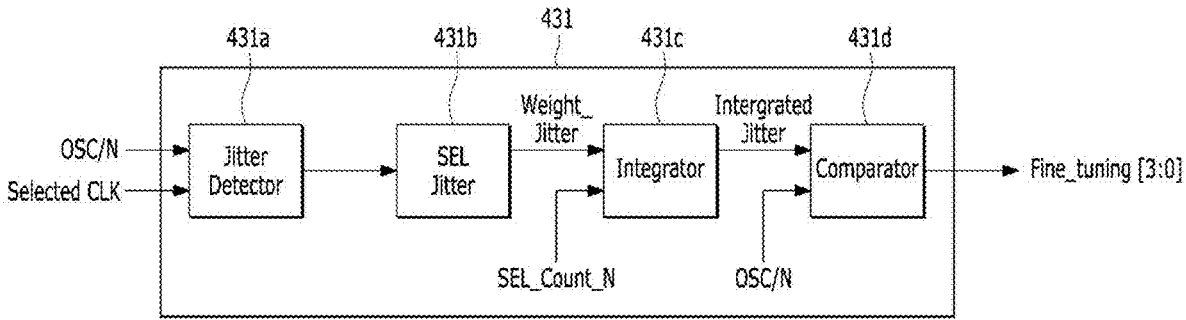
FIG. 9 is a block diagram illustrating in more detail an example of a jitter compensator illustrated in FIG. 8, and FIGS. 10 to 13 are example diagrams for explaining a configuration and an operation of the jitter compensator illustrated in FIG. 9.
Figure 10:
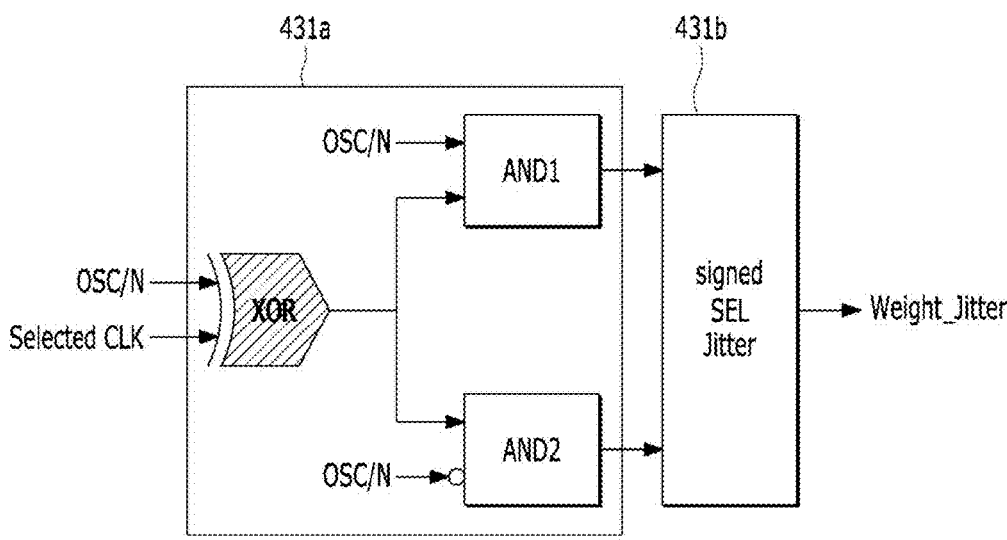
Figure 11:
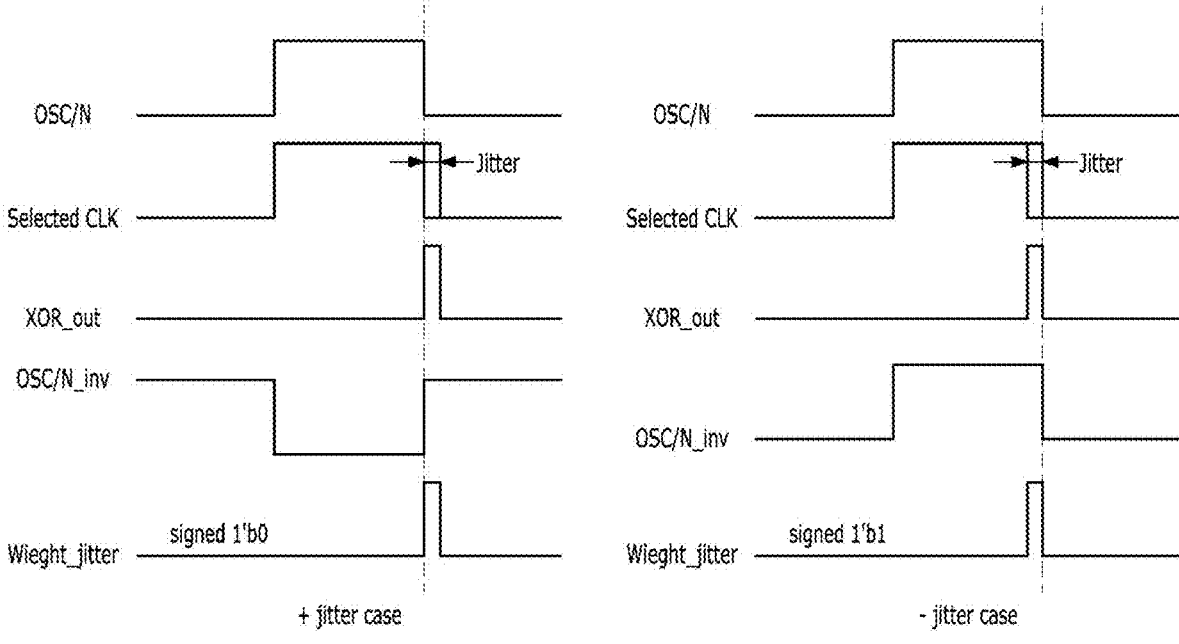

FIG. 8 is a block diagram illustrating a frequency generating circuit and a frequency compensation circuit included in a panel driving circuit 400 according to the first embodiment of the present disclosure, FIG. 9 is a block diagram illustrating in more detail a jitter compensator illustrated in FIG. 8, and FIGS. 10 to 13 are diagrams for explaining a configuration and an operation of the jitter compensator illustrated in FIG. 9.

Referring to FIG. 8, the panel driving circuit 400 can include a frequency generating circuit (or a frequency locked loop: FLL) 410, a GIP signal generating circuit (or GIP Block) 420, and a jitter compensation circuit (or a GIP locked loop: GLL) 430.

The frequency generating circuit 410 can generate an internal oscillator signal OSC of an internally set frequency band for driving of the GIP signal generating circuit 420, based on an external oscillator signal EOSC applied from the outside. The GIP signal generating circuit 420 can generate a clock signal GCLK, based on the internal oscillator signal OSC of a specific frequency band generated by the frequency generating circuit 410. The jitter compensation circuit 430 can compensate for a jitter (a temporal and random variation of an edge arrival time of a clock signal at a specific point) of the clock signal GCLK, based on the internal oscillator signal OSC output from the frequency generating circuit 410 and the clock signal GCLK output from the GIP signal generating circuit 420.

The frequency generating circuit 410 can include a first divider 411, a counter 412, a difference unit 413, a second divider 414, a comparator 415, a dynamic tuning circuit 416, and an oscillator IOSC.

The first divider 411 can divide the external oscillator signal EOSC by 1/M to output a first oscillator signal. Here, M can be set based on the clock signal GCLK output from the GIP signal generating circuit 420 and can be different from or equal to N which will be described below.

The counter 412 can count a first oscillator signal output from the first divider 411 and a second oscillator signal output from the second divider 414. The counter 412 can apply a count value of the first oscillator signal and a count value of the second oscillator signal to the difference unit 413.

The difference unit 413 can calculate a difference value N_diff between the count value of the first oscillator signal and the count value of the second oscillator signal. In a case which calculates the difference value N_diff, the difference unit 413 can refer to a reference count value N_ref (Ideal Count) including an ideal count value.

The second divider 414 can divide the internal oscillator signal OSC by 1/N to output a second oscillator signal. Here, N can be set based on the clock signal GCLK output from the GIP signal generating circuit 420 and can be different from or equal to M which will be described below.

The comparator 415 can compare an internally set reference value with the difference value N_diff and can output a result value based on a comparison result.

The dynamic tuning circuit 416 can generate an output value which is to be applied to the oscillator IOSC, based on a comparison result value output from the comparator 415. The dynamic tuning circuit 416 can be implemented based on a dynamic tuning capacitor, but is not limited thereto. For example, when a frequency is high, the dynamic tuning circuit 416 can output a high voltage value, and when a frequency is low, the dynamic tuning circuit 416 can output a low voltage value.

The oscillator IOSC can generate the internal oscillator signal OSC. The oscillator IOSC can vary a frequency of the internal oscillator signal OSC, based on an output value output from the dynamic tuning circuit 416. However, when jitter does not occur in the clock signal GCLK, the oscillator IOSC may not vary and can fix a frequency of the internal oscillator signal OSC, for driving stabilization.

The GIP signal generating circuit 420 can generate and output the clock signal GCLK for driving of a shift register included in the display panel 100, based on the internal oscillator signal OSC output from the oscillator IOSC. The clock signal GCLK output from the GIP signal generating circuit 420 can be applied to a gate driver through a clock signal line disposed in the display panel 100. The clock signal GCLK output from the GIP signal generating circuit 420 can be transferred to the jitter compensation circuit 430 through a clock signal feedback line.

Furthermore, the clock signal line and the clock signal feedback line can be disposed in a non-display area of the display panel 100. The clock signal line and the clock signal feedback line can be provided as one material, or can be provided as at least two materials. For example, when the clock signal line and the clock signal feedback line are provided as one material but does not intersect another electrode or line, the clock signal line and the clock signal feedback line can be implemented as at least two materials. In this case, the clock signal line and the clock signal feedback line can be selected as the same material as that of at least one of a gate electrode, a source electrode, and a drain electrode and can be disposed in the same layer, but are not limited thereto. Furthermore, referring to FIG. 6, a bending portion (or a region where the display panel is bendable) can be included in the display panel 100. In this case, like another signal line or voltage line, a stack structure of a portion, passing through the bending portion, of each of the clock signal line and the clock signal feedback line can be changed, so as to decrease a bending stress.

The jitter compensation circuit 430 can include a jitter correction circuit (or GIP jitter correction circuit) 431 and a jitter margin control circuit (or a jitter margin controller) 435. The jitter correction circuit 431 can feed back or sense and accumulate the clock signal GCLK output from the GIP signal generating circuit 420 and can generate a jitter correction value, based on the internal oscillator signal OSC output from the frequency generating circuit 410.

The jitter margin control circuit 435 can generate a jitter margin control value U/D/H for correcting jitter according to whether there is jitter or not and the intensity of jitter, based on the jitter correction value output from the jitter correction circuit 431. The jitter margin control value U/D/H can include an up correction value U, a down correction value D, and a hold correction value H, based on the jitter correction value. The dynamic tuning circuit 416 can increase, decrease, or hold an output value which is to be applied to the oscillator IOSC, based on the jitter margin control value U/D/H output from the jitter margin control circuit 435. Further, the jitter margin control circuit 435 can be included in the frequency generating circuit 410. In addition, although the jitter margin control circuit 435 is shown as separate from the jitter correction circuit 431, the present disclosure is not limited thereto, and the jitter margin control circuit 435 can also be included as a part of the jitter correction circuit 431.

Referring to FIG. 9, the jitter correction circuit 431 can include a jitter detection circuit (or a jitter detector) 431a which detects jitter, a jitter selection circuit (or a SEL jitter) 431b which generates a jitter selection value Weight_Jitter based on jitter, a jitter integral circuit (or an integrator) 431c which integrates the jitter selection value Weight_Jitter to generate an integral jitter value (Integrated Jitter), and a jitter comparison circuit (or a comparator) 431d which compares the internal oscillator signal OSC with the integral jitter value (Integrated Jitter).

Referring to FIGS. 8 to 11, the jitter detection circuit 431a can include an XOR gate XOR, a first AND gate AND1, and a second AND gate AND2. The XOR gate XOR can transfer, to the first AND gate AND1 and the second AND gate AND2, a division value OSC/N obtained by dividing the internal oscillator signal OSC output from the frequency generating circuit 410 and an output value XOR_out obtained by performing an XOR operation on one clock signal value (Selected CLK) selected from the clock signal GCLK output from the GIP signal generating circuit 420.

The first AND gate AND1 can perform an AND operation on the division value OSC/N obtained by dividing the internal oscillator signal OSC output from the frequency generating circuit 410 and the output value XOR_out of the XOR gate XOR to output a first AND operation value.

The second AND gate AND2 can perform an AND operation on an inversion value OSC/N_inv obtained by inverting the division value OSC/N obtained by dividing the internal oscillator signal OSC output from the frequency generating circuit 410 and the output value XOR_out of the XOR gate XOR to output a second AND operation value.

The jitter selection circuit 431b can output the jitter selection value Weight_Jitter for determining whether one clock signal value (Selected CLK) (a feedback or sensed clock signal) selected from the clock signal GCLK corresponds to a + jitter case or a – jitter case, based on the first AND operation value output from the first AND gate AND1 and the second AND operation value output from the second AND gate AND2.

When the clock signal value (Selected CLK) forms + jitter which does not correspond to the division value OSC/N obtained by dividing the internal oscillator signal OSC, the + jitter case can be determined. When the clock signal value (Selected CLK) forms – jitter which does not correspond to the division value OSC/N obtained by dividing the internal oscillator signal OSC, the – jitter case can be determined. For example, the jitter selection circuit 431b can allocate a binary value 0 (signed 1'b0) to the + jitter case and can allocate a binary value 1 (signed 1'b1) to the – jitter case.

Figure 12:
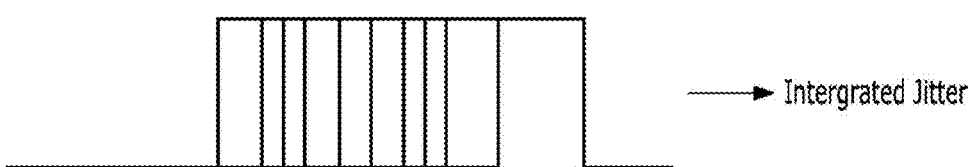
Figure 13:
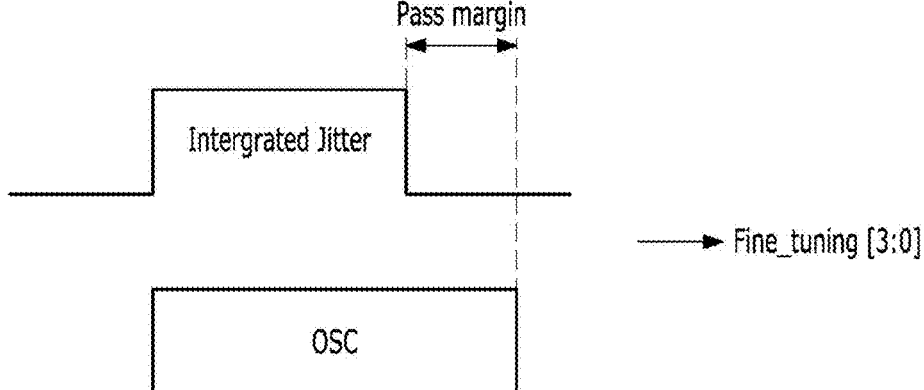

Referring to FIGS. 8, 9, and 12, the jitter integral circuit 431c can perform an accumulation integral (Weight_Jitter*SEL_Counter_N) on the jitter selection value Weight_Jitter output from the jitter selection circuit 431b to generate the integral jitter value (Integrated Jitter).

Referring to FIGS. 8, 9, 12, and 13, the jitter comparison circuit 431d can compare the integral jitter value (Integrated Jitter) output from the jitter integral circuit 431c with the division value OSC/N obtained by dividing the internal oscillator signal OSC output from the frequency generating circuit 410 and can generate a jitter correction value Fine_tuning [3:0], based on a pass margin value (Pass margin) provided through a comparison result. The jitter margin control circuit 435 can generate the jitter margin control value U/D/H which is to be applied to the dynamic tuning circuit 416, based on the jitter correction value Fine_tuning [3:0].

Figure 14:
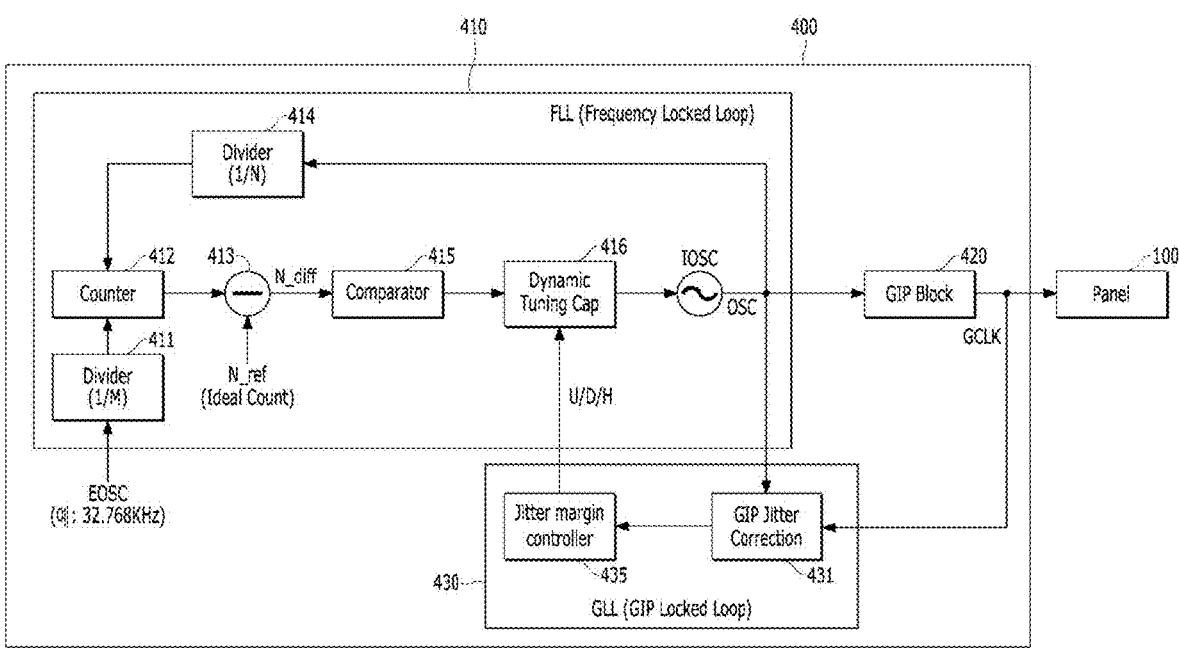
FIG. 14 is a block diagram illustrating a frequency generating circuit and a frequency compensation circuit included in a panel driving circuit according to another example embodiment of the present disclosure.
Figure 15:
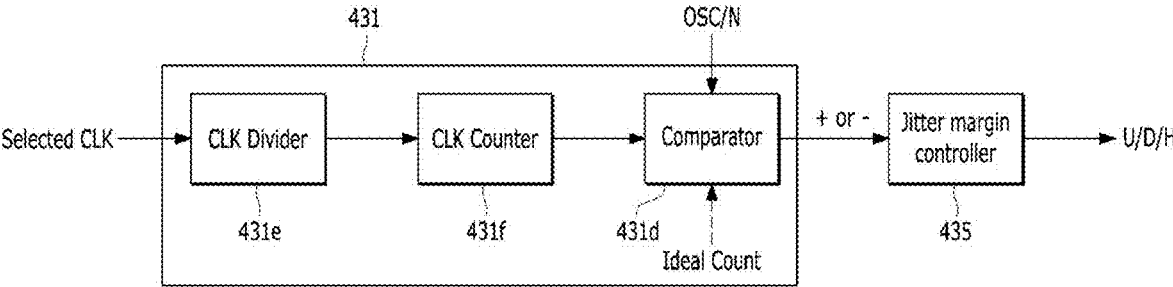
FIG. 15 is a block diagram illustrating in more detail an example of a jitter compensator illustrated in FIG. 14.

FIG. 14 is a block diagram illustrating a frequency generating circuit and a frequency compensation circuit included in a panel driving circuit 400 according to a second embodiment of the present disclosure, and FIG. 15 is a block diagram illustrating in more detail a jitter compensator illustrated in FIG. 14.

Referring to FIG. 14, the panel driving circuit 400 can include a frequency generating circuit (or a frequency locked loop (FLL) 410, a GIP signal generating circuit 420, and a jitter compensation circuit (or a GIP locked loop (GLL) 430.

The frequency generating circuit 410 can generate an internal oscillator signal OSC of an internally set frequency band for driving of the GIP signal generating circuit 420, based on an external oscillator signal EOSC applied from the outside.

The GIP signal generating circuit 420 can generate a clock signal GCLK, based on the internal oscillator signal OSC of a specific frequency band generated by the frequency generating circuit 410. The jitter compensation circuit 430 can compensate for a jitter (a temporal and random variation of an edge arrival time of a clock signal at a specific point) of the clock signal GCLK, based on the internal oscillator signal OSC output from the frequency generating circuit 410 and the clock signal GCLK output from the GIP signal generating circuit 420.

The frequency generating circuit 410 can include a first divider 411, a counter 412, a difference unit 413, a second divider 414, a comparator 415, a dynamic tuning circuit 416, and an oscillator IOSC. Details of a circuit included in the frequency generating circuit 410 can refer to the description of FIG. 8.

The jitter compensation circuit 430 can include a jitter correction circuit (or GIP jitter correction circuit) 431 and a jitter margin control circuit (or a jitter margin controller) 435. The jitter correction circuit 431 can feed back or sense the clock signal GCLK output from the GIP signal generating circuit 420 and can generate a jitter correction value, based on the clock signal GCLK and the internal oscillator signal OSC output from the frequency generating circuit 410.

The jitter margin control circuit 435 can generate a jitter margin control value U/D/H for correcting jitter according to whether there is jitter or not and the intensity of jitter, based on the jitter correction value output from the jitter correction circuit 431. The jitter margin control value U/D/H can include an up correction value U, a down correction value D, and a hold correction value H, based on the jitter correction value. The dynamic tuning circuit 416 can increase, decrease, or hold (when there is no jitter) an output value which is to be applied to the oscillator IOSC, based on the jitter margin control value U/D/H output from the jitter margin control circuit 435.

Referring to FIGS. 14 and 15, the jitter correction circuit 431 can include a signal division circuit (or a CLK divider) 431e, a signal count circuit (or a CLK counter) 431f, and a jitter comparison circuit (or a comparator) 431d. According to the second embodiment, as in the first embodiment, the jitter correction circuit 431 may not perform an accumulation integral during the number of times set/selected and can compensate for a jitter of the fed back or sensed clock signal. This will be described below.

The signal division circuit 431e can output a division value OSC/N obtained by dividing the internal oscillator signal OSC output from the frequency generating circuit 410. The signal count circuit 431f can count the division value OSC/N of the internal oscillator signal OSC output from the signal division circuit 431e to output a count value.

The jitter comparison circuit 431d can compare an ideal count value (Ideal Count) with the count value output from the signal count circuit 431f to obtain a comparison result. In another way, the jitter comparison circuit 431 can compare the count value output from the signal count circuit 431f with the internal oscillator signal OSC output from the frequency generating circuit 410 to obtain a comparison result. The jitter comparison circuit 431d can generate a + jitter correction value (+) or a – jitter correction value (–), based on the comparison result. The jitter margin control circuit 435 can generate the jitter margin control value U/D/H which is to be applied to the dynamic tuning circuit 416, based on the jitter correction value (+ or –).

Furthermore, the jitter compensation circuit according to the first embodiment and the second embodiment described above can be based on a clock signal applied to at least one of the first to fourth scan drivers 321 to 324 illustrated in FIG. 2. Particularly, when the jitter compensation circuit according to the first embodiment and the second embodiment described above is based on a clock signal for generating a scan signal used in a data sampling operation of a subpixel in the first to fourth scan drivers 321 to 324 illustrated in FIG. 2, a better effect can be realized. The reason can be because, when the scan signal used in the data sampling operation of the subpixel is stabilized, a flicker problem where noise or jitter of an oscillator reflected and accumulated in a clock signal adversely affects luminance and display quality in driving of a display panel can be reduced to a minimum extent.

Hereinabove, the present disclosure can solve/address (or minimize or at least partially reduce) a flicker limitation where noise or jitter of an oscillator reflected and accumulated in a clock signal can adversely affect luminance and display quality in driving of a display panel. The present disclosure can correct an output of the oscillator, based on jitter of the clock signal for driving a gate driver, thereby enhancing driving stability and reliability.

The effects according to the present disclosure are not limited to the above examples, and other various effects can be included in the specification.

While the present disclosure has been particularly shown and described with reference to example embodiments thereof, it will be understood by those of ordinary skill in the art that various changes in form and details can be made therein without departing from the technical and scope of the present disclosure as defined by the appended claims.

What is claimed is:

1. A display apparatus comprising:

a display panel configured to display an image;

a gate driver configured to apply a gate signal to the display panel;

a driving circuit including a signal generating circuit configured to generate a clock signal for driving the gate driver and a frequency generating circuit configured to generate an internal oscillator signal to allow the clock signal to be generated with an internally set frequency band; and a jitter correction circuit configured to correct a jitter of the clock signal, based on the internal oscillator signal and the clock signal fed back from the signal generating circuit, wherein the jitter correction circuit is configured to correct the jitter of the clock signal, and wherein the jitter correction circuit comprises:

a jitter detection circuit configured to detect the jitter of the clock signal;

a jitter selection circuit configured to generate a jitter selection value based on the jitter of the clock signal;

a jitter integral circuit configured to accumulate and integrate the jitter selection value to generate an integral jitter value; and a jitter comparison circuit configured to compare the integral jitter value with the internal oscillator signal.

2. The display apparatus of claim 1, wherein the jitter detection circuit comprises:

an XOR (Exclusive OR) gate configured to perform an XOR operation on the clock signal and a division value obtained by dividing the internal oscillator signal to provide an output value;

a first AND gate configured to perform an AND operation on the output value of the XOR gate and the division value obtained by dividing the internal oscillator signal to output a first AND operation value; and a second AND gate configured to perform an AND operation on the output value of the XOR gate and an inversion value obtained by inverting the division value to output a second AND operation value.

3. The display apparatus of claim 2, wherein the jitter selection circuit outputs the jitter selection value defining whether the jitter of the clock signal is + jitter or − jitter, based on the first AND operation value and the second AND operation value.

4. The display apparatus of claim 1, wherein the jitter correction circuit comprises:

a signal division circuit configured to output a division value obtained by dividing the internal oscillator signal; and a signal count circuit configured to count the division value of the internal oscillator signal output from the signal division circuit to output a count value, wherein the jitter comparison circuit is configured to compare the internal oscillator signal with the count value output from the signal count circuit and generate a jitter correction value, based on a comparison result.

5. The display apparatus of claim 4, wherein the jitter correction circuit comprises a jitter margin control circuit configured to generate a jitter margin control value for correcting a jitter according to whether there is a jitter or not and an intensity of the jitter, based on the jitter correction value output from the jitter correction circuit.

6. The display apparatus of claim 1, wherein the jitter correction circuit is included in the driving circuit.

7. A driving method of the display apparatus of claim 1, the driving method comprising:

detecting the jitter of the clock signal for driving the gate driver;

generating the jitter selection value based on the jitter of the clock signal;

accumulating and integrating the jitter selection value to generate the integral jitter value; and comparing the integral jitter value with the internal oscillator signal to generate a comparison result, and generating a jitter correction value for correcting the jitter of the clock signal, based on the comparison result.

8. A display apparatus comprising:

a display panel configured to display an image;

a gate driver configured to apply a gate signal to the display panel;

a driving circuit including a signal generating circuit configured to generate a clock signal for driving the gate driver and a frequency generating circuit configured to generate an internal oscillator signal to allow the clock signal to be generated with an internally set frequency band; and a jitter correction circuit configured to correct a jitter of the clock signal, based on the internal oscillator signal and the clock signal fed back from the signal generating circuit, wherein the jitter correction circuit comprises:

a signal division circuit configured to output a division value obtained by dividing the internal oscillator signal;

a signal count circuit configured to count the division value of the internal oscillator signal output from the signal division circuit to output a count value; and a jitter comparison circuit configured to compare the internal oscillator signal with the count value output from the signal count circuit and generate a jitter correction value, based on a comparison result.

* * * * *